United States Patent
Zwarts

Patent Number: 5,442,362
Date of Patent: Aug. 15, 1995

[54] RADAR APPARATUS

[75] Inventor: Johan M. C. Zwarts, Borne, Netherlands

[73] Assignee: Hollandse Signaalapparaten B.V., Hengelo, Netherlands

[21] Appl. No.: 103,312

[22] Filed: Aug. 9, 1993

Related U.S. Application Data

[63] Continuation of Ser. No. 921,328, Jul. 29, 1992, abandoned.

[30] Foreign Application Priority Data

Aug. 29, 1991 [NL] Netherlands ............... 9101459

[51] Int. Cl.6 .................. G01S 7/04; G01S 13/66
[52] U.S. Cl. .................. 342/176; 342/197; 342/179; 342/91; 342/98
[58] Field of Search .......... 342/176, 179, 197, 90, 342/91, 94, 95, 96, 97, 82, 83, 84, 85, 98

[56] References Cited

U.S. PATENT DOCUMENTS

| | | | |
|---|---|---|---|
| 3,603,989 | 9/1971 | Caspers | 342/74 |
| 3,653,044 | 3/1972 | Breeze et al. | 342/185 |
| 3,715,753 | 2/1973 | Applebaum et al. | 342/131 |
| 3,813,670 | 5/1974 | Alpers | 342/95 |
| 3,896,434 | 7/1975 | Sirven | 342/132 |
| 4,003,052 | 1/1977 | Adelman et al. | 342/162 |
| 4,005,415 | 1/1977 | Kossiakoff et al. | 342/90 |
| 4,060,791 | 11/1977 | Jones et al. | 342/181 X |
| 4,119,963 | 10/1978 | Zwarts et al. | 342/203 |
| 4,136,341 | 1/1979 | Mulder et al. | 342/160 |
| 4,151,527 | 4/1979 | Masliah et al. | 342/75 |
| 4,209,853 | 6/1980 | Hyatt | 342/179 X |
| 4,375,641 | 3/1983 | Josefsson et al. | 342/88 |
| 4,404,561 | 9/1983 | Mulder et al. | 342/147 |
| 4,630,051 | 12/1986 | Adams et al. | 342/133 |
| 4,642,641 | 2/1987 | Campbell | 342/82 |
| 4,646,097 | 2/1987 | King | 342/95 |
| 4,720,711 | 1/1988 | Quesinberry et al. | 342/96 |
| 4,743,907 | 5/1988 | Gellekink | 342/59 |
| 4,907,000 | 3/1990 | Tabourier | 342/84 |
| 4,972,193 | 11/1990 | Rice | 342/90 |
| 4,973,968 | 11/1990 | Hurd | 342/137 |
| 5,032,842 | 7/1991 | Tanigaki et al. | 342/182 |
| 5,093,649 | 3/1992 | Johnson | 342/157 |
| 5,115,246 | 5/1992 | Thomas, Jr. et al. | 342/195 |
| 5,128,684 | 7/1992 | Brown | 342/189 |
| 5,130,715 | 7/1992 | Yanagisawa | 342/158 |
| 5,148,175 | 9/1992 | Woolfolk | 342/95 |
| 5,334,985 | 8/1994 | Tucker et al. | 342/176 |

FOREIGN PATENT DOCUMENTS

| | | |
|---|---|---|
| 0016597 | 10/1980 | European Pat. Off. . |
| 0322017 | 6/1989 | European Pat. Off. . |
| 85/00896 | 2/1985 | WIPO . |

*Primary Examiner*—John B. Sotomayor
*Attorney, Agent, or Firm*—Oblon, Spivak, McClelland, Maier & Neustadt

[57] ABSTRACT

Radar apparatus provided with a signal generator (1), transmitter means (2), antenna means (3), receiver means (4), a video processor (6) and an indication device (7) for the generation of a radar picture of the surroundings of the radar apparatus with a first resolution. A selected target, designated with control unit (8), may be displayed on the indication device (7) with a second, higher resolution. To this end signal generator (1) generates in the direction of the selected target control signals for transmitter (2) with an increased bandwidth. Selection and conversion unit (5) matches echoes of these increased bandwidth signals to the bandwidth of video processor (6) and indication device (7).

20 Claims, 3 Drawing Sheets

RADAR APPARATUS

This application is a continuation of application Ser. No. 07/921,328, filed on Jul. 29, 1992, now abandoned.

BACKGROUND OF THE INVENTION

The invention relates to a radar apparatus for detecting targets, provided with a signal generator with transmitter means coupled to it and receiver means with a video processor coupled to it, antenna means coupled to the transmitter and receiver means, and an indication device suitable for the display, in a first mode with a first range resolution, of a radar picture generated by the video processor, of targets which are in a part of the radar apparatus surroundings.

In a state-of-the-art radar apparatus, the bandwidth of the transmitted signal, the bandwidth of the receiver means and the bandwidth of the video processor and the indication device are usually identical. This bandwidth is determined by a range resolution desired for that radar apparatus.. As known in radar technology, the bandwidth is inversely proportional to the theoretically feasible range resolution. The transmitted signal shall then be provided with some type of modulation which, in conjunction with a matched filter incorporated in the receiver means, realizes the desired range resolution.

If, according to this state of the art, a greater range resolution is to be realized, the transmitter means, receiver means, video processor and indication device shall be adapted accordingly. With the radar apparatus according to the invention, the bandwidth of the video processor and the indication device may be considerably narrower than the above-mentioned, theoretically required bandwidth for realizing a certain range resolution.. This entails that not the entire echo signal of a transmitting signal, but only a portion of this signal selected in time, is used. This may be of advantage when observing a target by means of a radar apparatus and when it is desirable for identification purposes to analyse the target and its immediate surroundings at an increased range resolution.

SUMMARY OF THE INVENTION

To this end, the radar apparatus according to the invention is characterised in that the radar apparatus is furthermore provided with means for the selection of at least one target and, in a second mode, the generation of a radar picture of surroundings of that target with a second range resolution which exceeds the first range resolution.

BRIEF DESCRIPTION OF THE DRAWINGS

The invention will be further explained with reference to the following figures, of which.

DETAILED DESCRIPTION OF THE INVENTION

Figure 1:
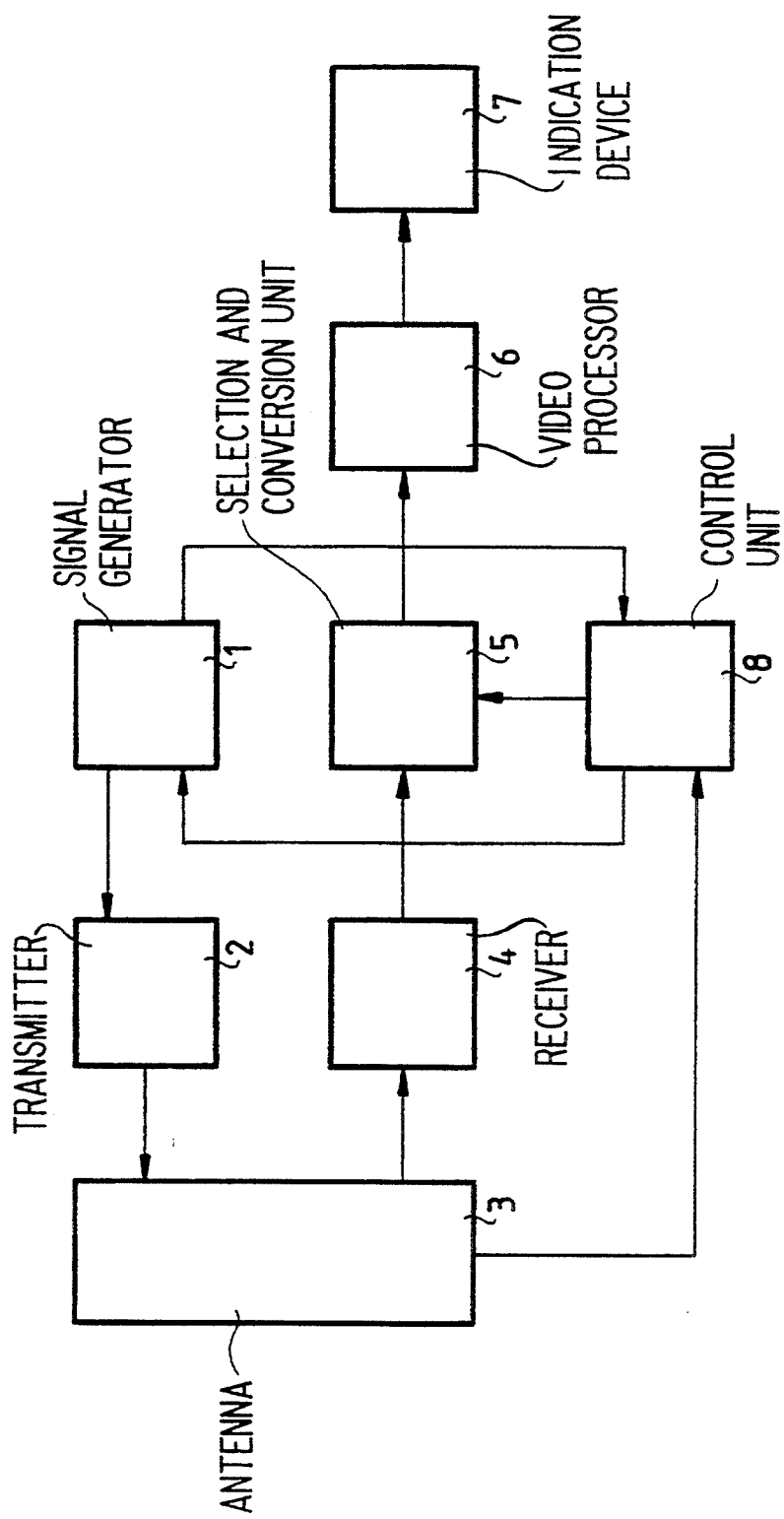
FIG. 1 represents a block diagram of a radar apparatus according to the invention.

FIG. 1 shows a block diagram of a possible embodiment of a radar apparatus according to the invention. Upon switch-on, a signal generator 1 generates a ‚control signal for transmitter means 2, which are connected to antenna means 3. These antenna means 3 may either be a conventional, rotating type of antenna, or a phased array antenna which performs an electronically-steered search scan. Echo signals received by antenna means 3 are fed to receiver means 4 and subsequently applied to a video processor 6 by a selection and conversion unit 5, which is assumed to be initially inactive. Echo signals processed by video processor 6 are visualized on an indication device 7, which will generally be a display unit presenting the radar apparatus surroundings. In this configuration the radar apparatus operates entirely according to the state of the art.

The radar apparatus according to the invention enables a target, observed on the indication device 7, to be monitored at an increased range resolution. To this effect, the radar apparatus is provided with a control unit 8, by means of which a certain target can be designated. Control unit 8 may be provided with a rolling ball or a joystick for correlating a symbol with the target on the indication device 7, or with a keyboard by means of which the target coordinates may be entered. Furthermore, control unit 8 receives the instantaneous azimuth direction from the antenna means 3 and receives a sync signal from signal generator 1, if a control signal for the transmitter means is delivered.

If the instantaneous azimuth direction at least substantially coincides with the target direction, signal generator 1 receives a signal from control unit 8, and proceeds to generate control signals for the transmitter means at an increased bandwidth. The control signals are modulated such that the desired increased range resolution may be obtained by auto-correlation. Control signals with such a type of modulation are well-known in radar engineering and may be pulse-modulation, frequency-modulation, phase-modulation or pseudo noise-modulation. The control signal having a larger bandwidth may be transmitted for example in an azimuth sector of 5 degrees around the target to be observed. In this azimuth sector echoes will be produced, which contain, at least potentially, the desired increased range resolution.

Figure 2:
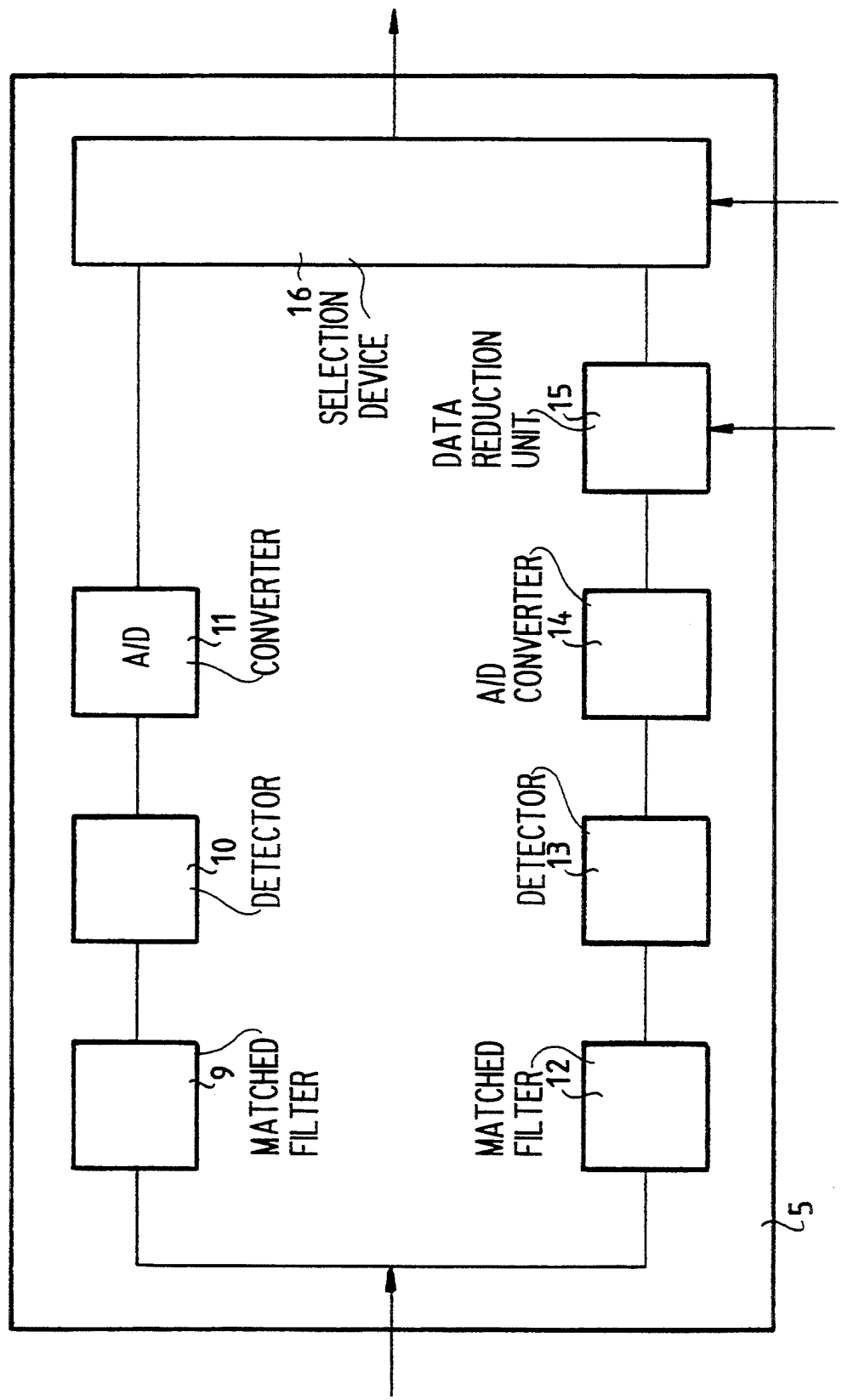
FIG. 2 represents a block diagram of a first embodiment of the selection and conversion unit.

The measures required for converting this potentially increased range resolution into a radar picture with increased resolution on the indication device, are presented in FIG. 2. This figure represents a block diagram of a first embodiment of the selection and conversion unit 5. This unit comprises two branches. One branch consists of matched filter 9, optimized for echoes of standard transmitter signals, detector 10 for the generation of analog video and A/D converter 11 for the conversion of analog video to digital video. Detector 10 may either be a simple envelope detector, or in the case of a radar apparatus whose video processor applies MTI or MTD processing, a quadrature detector. If a quadrature detector is used, A/D converter 11 is duplicated, all entirely compliant with the state of the art.

In effect, the invention is embodied in the second branch. This branch comprises a matched filter 12, optimized for echoes of wideband transmitter signals, detector 13 for the generation of analog video, A/D converter 14, and data reduction unit 15, which contains a storage unit. Since wideband signals are processed in this branch, the sampling speed of A/D converter 14 shall be selected to be higher than the sampling speed of A/D converter 11. This means that between two transmitted signals, A/D converter 14 will yield more samples than A/D converter 11. Video processor 6, however, is equipped for the reception of the number of samples delivered by A/D converter 11. In view of this and according to the invention, only a part of the samples delivered by A/D converter 14 is stored in the memory circuit of data reduction unit 15 at the command of control unit 8 and after a subsequent transmitted signal, read at a sampling speed which is in line with the fixed sampling speed of video processor 6 and with the sampling speed of A/D converter 11. The samples thus delivered by the memory circuit can be processed by video processor 6 and present the radar picture with the desired increased resolution for display on indication device 7.

Both branches are eventually combined by a first selection device 16 which, at the command of control unit 8, connects one of the two branches to video processor 6.

In a specific embodiment of the first embodiment, signal generator 1 generates, in the first mode, pulsed control signals having a length of 1 μsec at a pulse repetition time of 200 μsec. Consequently the range resolution is approximately 150 m. Matched filter 9 consists of a bandpass filter having a bandwidth of 1 MHz. A/D converter 11 samples the output of detector 10 at a frequency of 2 MHz. This means that in the first mode, 400 digitized measuring values are fed to video processor 6 between two transmitter pulses. In the second mode, signal generator 1 generates pulsed control signals having a length of 0.1 μsec at a pulse repetition time of 200 μsec. The range resolution is now approximately 15 m. Matched filter 12 consists of a bandpass filter having a bandwidth of 10 MHz. A/D converter 14 samples the output of detector 13 at a frequency of 20 MHz. This means that in the second mode, 4000 digitized samples are generated between two transmitter pulses. Only 400 of these samples, successively obtained around the target, are selected and stored in the memory circuit of data reduction unit 15..After the next ensuing transmitter pulse these 400 samples are read from the memory circuit at a clock frequency of 2 MHz and are fed to the video processor via the first selection device 16. After processing by video processor 6 the 400 range quants are applied to the indication device 7, which will generally be a PPI. This indication device displays the 400 range quants which represented a 30 km range in the first mode and represent a 3 km range in the second mode.

Figure 3:
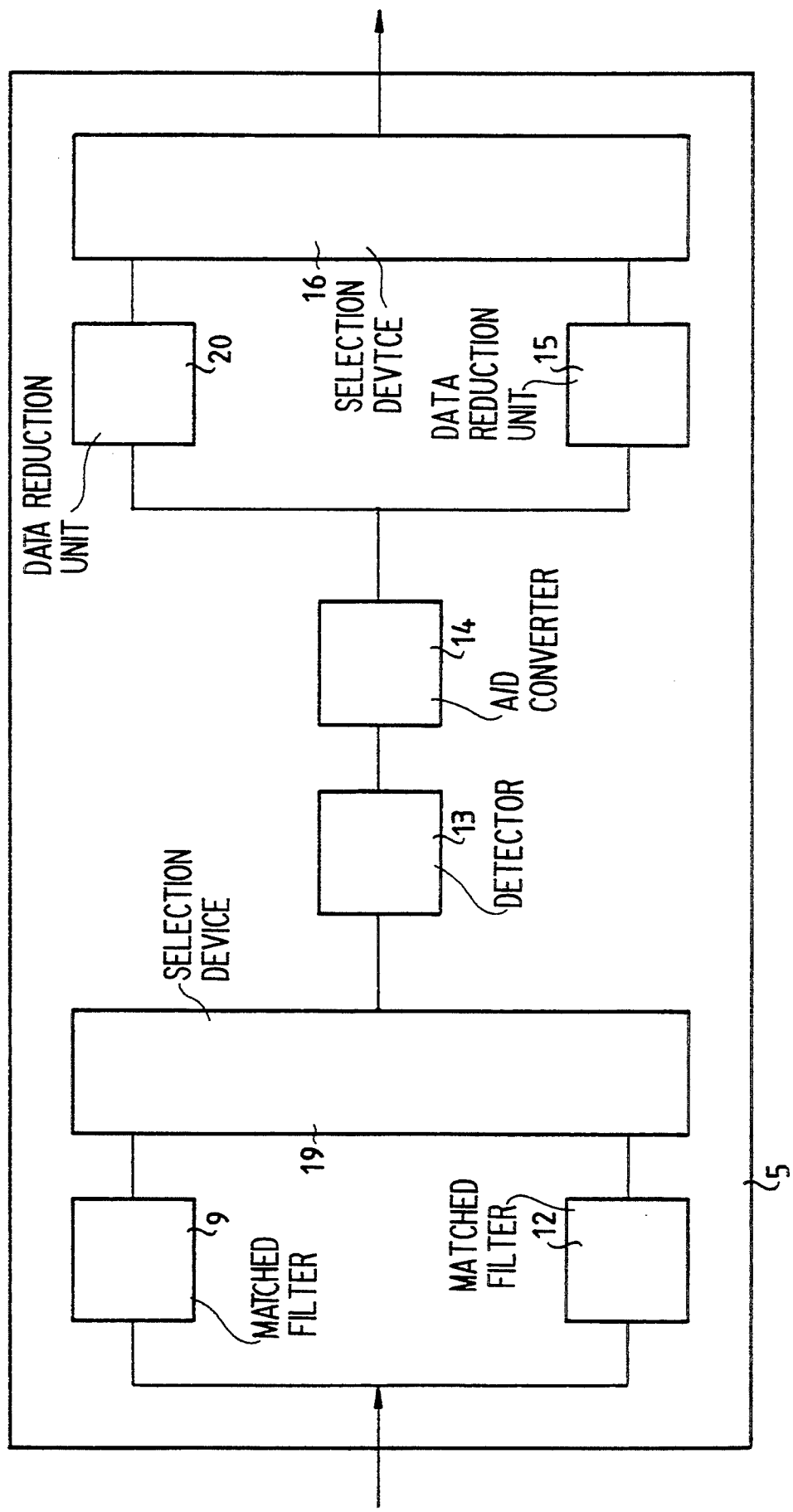
FIG. 3 represents a block diagram of a second embodiment of the selection and conversion unit.

FIG. 3 shows a block diagram of a second embodiment of the selection and conversion unit 5, in which only one detector 13 and one A/D converter 14 is used. In this case detector 13 is preceded by a second selection device 19 which, at the command of control unit 8, enables the output of one of the two matched filters 9, 12 to be connected to detector 13. The sampling speed of A/D converter 14 has been selected such that wideband signals, i.e. echoes of signals transmitted in a wide band, can be sampled without information loss. This entails that in processing narrow-band signals, these signals are oversampled by A/D converter 14. To cure this, a first data reduction unit 20 is connected between A/D converter 14 and video processor 6 to reduce the sampling speed of A/D converter 14 to the fixed sampling speed of video processor 6. If we assume the oversampling factor to be M, data reduction unit 20 will, in a most elementary embodiment, only pass each Mth sample. A better method, however, is to provide the data reduction unit 20 with a digital low-pass filter and to subsequently pass each Mth sample. This data reduction method, well known in the art, improves the signal-noise ratio and the dynamic range of the processed signal.

For wideband signals a second data reduction unit 15 is provided, which operates entirely according to the description of FIG. 2. The combination of the outputs of the two data reduction units 15, 20 is effected by the first selection device 16 which, at the command of control unit 8, connects the output of one of the two data reduction units to video processor 6.

Also as regards this embodiment, the requirement prevails that in the case of a radar apparatus whose video processor applies MTI or MTD processing, detector 13 is a quadrature detector and A/D converter 14 is duplicated. Both reduction units 15, 20 and the first selection device 16 will then be dual-channeled. As an alternative, the single video obtained with one detector and one A/D converter can after first selection device 16 be split up into quadrature video using a Hilbert filter, well known in the art.

In a special embodiment of the second embodiment, signal generator 1 generates, in the first mode, pulsed control signals having a length of 1 μsec and a pulse repetition time of 200 μsec. The range resolution will then approximately be 150 m. Matched filter 9 consists of a bandpass filter having a bandwidth of 1 MHz. In the second mode, signal generator 1 also generates pulsed control signals having a length of 1 μsec and a pulse repetition time of 200 μsec, provided, however, with a linear FM modulation having a bandwidth of 10 MHz. Matched filter 12 consists of a pulse compression line which compresses the 1 μsec pulse with the linear FM modulation to a pulse having a length of 0.1 μsec. A/D converter 14 samples the output of detector 13 at a frequency of 20 MHz. In the first mode, 4000 digitized samples are generated between two transmitter pulses, which results in 20 samples per 150 m, the range resolution in this mode. The first data reduction unit limits this number to 400 samples, which consequently amounts to 2 per 150 m. To this end, said data reduction unit comprises a digital low-pass filter with a cut-off frequency of 1 MHZ, after which each tenth sample is passed to the first selection device, as a result of which the clock frequency is reduced to 2 MHz.

In the second mode, 4000 digitized samples are generated between two transmitter pulses. The second data reduction unit 15 limits this number to 400 samples surrounding the target. These samples are stored in the memory circuit of the second data reduction unit 15. After the next ensuing transmitter pulse, these 400 samples are read from the memory circuit at a clock frequency of 2 MHz. In the first as well as in the second mode, video processor 6 shall be suitable for processing 400 digitized samples which are presented at a clock frequency of 2 MHz.

Nowadays, radar apparatuses coupled to fire control equipment for which a short reaction time is required, do not always use an indication device. Instead of this device, the radar apparatus is equipped with a track radar which, should the occasion arise, is capable of independently activating weapons against targets. For identification reasons, it could be essential to observe a target at an increased range resolution. According to the considerations underlying the invention, the track computer, instead of the human operator, can then designate a target and subsequently request an increased range resolution for this target.

I claim:

1. Radar apparatus for detecting targets, provided with a signal generator with transmitter means coupled to it and receiver means with a video processor coupled to it, antenna means coupled to the transmitter and receiver means, and an indication device suitable for the display, in a first mode with a first range resolution, of a radar picture generated by the video processor, of targets which are in a part of the radar apparatus surroundings, characterized in that the radar apparatus is furthermore provided with means for the selection of at least one designated target within the radar picture and, in a second mode, the generation of a radar picture of surroundings of that at least one designated target with a second range resolution which exceeds the first range resolution, wherein in the first mode, the signal generator generates signals of a first bandwidth which corresponds with the first range resolution and, in the second mode, generates signals of a second bandwidth which corresponds with the second range resolution, and with a control unit coupled to the antenna for switching the signal generator from the first mode into the second mode if an azimuth direction of the antenna and an azimuth direction of the at least one designated target at least substantially coincide.

2. Radar apparatus according to claim 1, characterised in that said means are provided with a control unit coupled to the antenna means for switching the signal generator from the first mode into the second mode if the azimuth direction of the antenna means and the azimuth direction of a selected target at least substantially coincide.

3. Radar apparatus according to claim 1 or 2, whose video processor is equipped for the processing, at a fixed sampling speed, of signals having a bandwidth which at least substantially corresponds with the first bandwidth, characterised in that said means are furthermore provided with a selection and conversion unit connected between the receiver means and the video processor for selecting echo signals of the transmitted signals of the second bandwidth of the surroundings of the selected target and for converting these echo signals into a signal which corresponds with the sampling speed and bandwidth of the video processor.

4. Radar apparatus according to claim 3, characterised in that the selection and conversion unit comprises a first A/D converter equipped for sampling and digitizing signals of the first bandwidth; a second A/D converter equipped for sampling and digitizing signals of the second bandwidth, followed by a data reduction unit for converting signals of the target surroundings into a signal which corresponds with the video processor bandwidth; and a first selection device for selecting, in the first mode, the output of the first A/D converter and for selecting, in the second mode, the output of the data reduction unit.

5. Radar apparatus according to claim 4, characterised in that the data reduction unit comprises a memory circuit for storing at least a portion of the signals generated by the second A/D converter and for subsequently delivering at least a portion of the stored signals at a sampling speed which corresponds with the video processor bandwidth.

6. Radar apparatus according to claim 5, characterised in that the first A/D converter is preceded by a matched filter for signals of the first bandwidth and in that the second A/D converter is preceded by a matched filter for signal of the second bandwidth.

7. Radar apparatus according to claim 3, characterised in that the selection and conversion unit comprises an A/D converter, equipped for sampling and digitizing signals of the second bandwidth, followed by a first data reduction unit for converting digitized signals of the first bandwidth into a signal which corresponds with the fixed sampling speed of the video processor and a second data reduction unit for converting digitized signals of the second bandwidth from the target surroundings into a signal which corresponds with the video processor bandwidth, and a first selection device for the selection, at the command of the control unit, of the output signals of the first or the second data reduction unit for connection to the video processor.

8. Radar apparatus according to claim 7, characterised in that the first data reduction unit is provided with a digital low-pass filter.

9. Radar apparatus according to claim 7, characterised that the second data reduction unit comprises a memory circuit for storing at least a portion of the signals generated by the A/D converter and for subsequently delivering at least a portion of the stored signals at a sampling speed which corresponds with the video processor bandwidth.

10. Radar apparatus according to claim 7, characterised in that the A/D converter is preceded by a first matched filter for signals of the first bandwidth and a second matched filter for signals of the second bandwidth, and a second selection device for selecting, at the command of the control unit, the output signals of the first or the second matched filter for applying to the A/D converter.

11. A radar apparatus for detecting targets, comprising:
   a signal generator;
   a transmitter coupled to the signal generator for receiving signals generated by the signal generator;
   a receiver for receiving transmitted signals;
   a video processor coupled to the receiver;
   an antenna coupled to the transmitter and receiver means;
   an indication device coupled to the video processor for displaying information received by the receiver;
   wherein the radar apparatus is operable in a first mode with a first range resolution where the signal generator generates a radar picture generated by the video processor, and in a second mode in which at least one designated target within the radar picture is selected and in which the signal generator generates a radar picture of surroundings of the at least one designated target with a second range resolution which exceeds the first range resolution, wherein in the first mode the signal generator generates signals of a first bandwidth which corresponds with the first range resolution and, in the second mode, the signal generator generates signals of a second bandwidth which corresponds with the second range resolution; and
   a control unit coupled to the antenna for switching the signal generator from the first mode into the second mode if an azimuth direction of the antenna and an azimuth direction of the at least one designated target at least substantially coincide.

12. The radar apparatus according to claim 11, further comprising a control unit coupled to the antenna for switching the signal generator from the first mode into the second mode if an azimuth direction of the antenna and an azimuth direction of a selected target at least substantially coincide.

13. The radar apparatus according to either of claims 11 or 12, wherein the video processor is equipped for the processing, at a fixed sampling speed, of signals having a bandwidth which at least substantially corresponds with the first bandwidth, and further comprising a selection and conversion unit connected between the receiver and the video processor for selecting echo signals of the transmitted signals of the second bandwidth of the surroundings of the selected target and for converting these echo signals into a signal which corresponds with the sampling speed and bandwidth of the video processor.

14. The radar apparatus according to claim 13, wherein the selection and conversion unit comprises:
   a first A/D converter for sampling and digitizing signals of the first bandwidth;
   a second A/D converter for sampling and digitizing signals of the second bandwidth;
   a data reduction unit for converting signals of the target surroundings into a signal which corresponds with the video processor bandwidth; and
   a first selection device for selecting, in the first mode, the output of the first A/D converter and for selecting, in the second mode, the output of the data reduction unit.

15. The radar apparatus according to claim 14, wherein the data reduction unit comprises a memory circuit for storing at least a portion of the signals generated by the second A/D converter and for subsequently delivering at least a portion of the stored signals at a sampling speed which corresponds with the video processor bandwidth.

16. The radar apparatus according to claim 15, wherein the first A/D converter is preceded by a first matched filter for signals of the first bandwidth and the second A/D converter is preceded by a second matched filter for signals of the second bandwidth.

17. The radar apparatus according to claim 13, wherein the selection and conversion unit comprises an A/D converter for sampling and digitizing signals of the second bandwidth, followed by a first data reduction unit for converting digitized signals of the first bandwidth into a signal which corresponds with the fixed sampling speed of the video processor, and a second data reduction unit for converting digitized signals of the second bandwidth from the target surroundings into a signal which corresponds with the video processor bandwidth, and a first selection device for the selection, at the command of the control unit, of the output signals of the first or the second data reduction unit for connection to the video processor.

18. The radar apparatus according to claim 17, wherein the first data reduction unit is provided with a digital low-pass filter.

19. The radar apparatus according to claim 17, wherein the second data reduction unit comprises a memory circuit for storing at least a portion of the signals generated by the A/D converter and for subsequently delivering at least a portion of the stored signals at a sampling speed which corresponds with the video processor bandwidth.

20. The radar apparatus according to claim 17, wherein the A/D converter is preceded by a first matched filter for signals of the first bandwidth and a second matched filter for signals of the second bandwidth, and a second selection device for selecting, at the command of the control unit, the output signals of the first or the second matched filter for applying to the A/D converter.

* * * * *